United States Patent
Appel et al.

(10) Patent No.: US 9,631,151 B2
(45) Date of Patent: Apr. 25, 2017

(54) APPARATUSES, SYSTEMS, TAR CRACKERS, AND METHODS FOR GASIFYING HAVING AT LEAST TWO MODES OF OPERATION

(71) Applicant: AG ENERGY SOLUTIONS, INC., Spokane, WA (US)

(72) Inventors: Philip W. Appel, Cheney, WA (US); Thomas D. Weir, Pullman, WA (US); Jacob M. Culley, Spokane, WA (US)

(73) Assignee: AG ENERGY SOLUTIONS, INC., Spokane, WA (US)

( * ) Notice: Subject to any disclaimer, the term of this patent is extended or adjusted under 35 U.S.C. 154(b) by 48 days.

(21) Appl. No.: 14/846,066

(22) Filed: Sep. 4, 2015

(65) Prior Publication Data
US 2016/0068772 A1    Mar. 10, 2016

Related U.S. Application Data (60) Provisional application No. 62/046,076, filed on Sep. 4, 2014.

(51) Int. Cl.
| | |
|---|---|
| C10J 3/84 | (2006.01) |
| C10J 3/72 | (2006.01) |
| C10K 3/00 | (2006.01) |

(52) U.S. Cl.
CPC ............ *C10J 3/84* (2013.01); *C10J 3/723* (2013.01); *C10J 3/726* (2013.01); *C10K 3/008* (2013.01);
(Continued)

(58) Field of Classification Search
CPC combination set(s) only.
See application file for complete search history.

(56) References Cited

U.S. PATENT DOCUMENTS

| 4,278,064 A | 7/1981 | Regueiro |
| 4,428,308 A | 1/1984 | Birchfield et al. |

(Continued)

FOREIGN PATENT DOCUMENTS

| CN | 101693842 | 4/2010 |
| CN | 102492443 | 6/2012 |

(Continued)

OTHER PUBLICATIONS

International Search Report and Written Opinion received for International Application No. PCT/US2015/048564, dated Oct. 29, 2015.

(Continued)

*Primary Examiner* — Kaity Handal
(74) *Attorney, Agent, or Firm* — Dorsey & Whitney LLP (57) ABSTRACT

Apparatuses, systems, tar crackers, and methods for breaking down vaporized tars in a syngas stream are described. An example system may include a gasifier comprising a combustion chamber configured to, during a startup operation, receive heated air at a first port near a bottom of the combustion chamber and to support combustion of a column of biomass feedstock in an upward direction within the combustion chamber. The combustion chamber may be further configured to receive, during normal operation, air at a second port near a top of the combustion chamber to support gasification of the column of biomass feedstock in a downward direction within the combustion chamber to provide syngas from the first port near the bottom of the combustion chamber.

15 Claims, 5 Drawing Sheets

(52) U.S. Cl.
CPC .. *C10J 2300/092* (2013.01); *C10J 2300/0916* (2013.01); *C10J 2300/0956* (2013.01); *C10J 2300/1246* (2013.01); *C10J 2300/1618* (2013.01); *Y02P 20/145* (2015.11)

(56) References Cited

U.S. PATENT DOCUMENTS

| | | | |
|---|---|---|---|
| 4,452,611 A * | 6/1984 | Richey | C10J 3/26 110/229 |
| 4,502,633 A | 3/1985 | Saxon | |
| 4,599,092 A | 7/1986 | Eichelsbacher et al. | |
| 4,764,185 A | 8/1988 | Mayer | |
| 4,872,954 A | 10/1989 | Hogan | |
| 5,026,403 A * | 6/1991 | Michel-Kim | C10J 3/02 48/203 |
| 5,138,957 A | 8/1992 | Morey et al. | |
| 7,763,088 B2 | 7/2010 | Feldmann | |
| 7,856,829 B2 | 12/2010 | Shah et al. | |
| 7,909,899 B2 | 3/2011 | Diebold et al. | |
| 7,947,155 B1 | 5/2011 | Green et al. | |
| 8,003,833 B2 | 8/2011 | Appel et al. | |
| 8,317,886 B2 | 11/2012 | Graham et al. | |
| 2003/0005634 A1 * | 1/2003 | Calderon | C10J 3/08 48/210 |
| 2003/0110994 A1 | 6/2003 | Lissianski et al. | |
| 2004/0182294 A1 | 9/2004 | Hahn et al. | |
| 2008/0086945 A1 | 4/2008 | Wunning | |
| 2008/0244976 A1 * | 10/2008 | Paisley | C07C 4/04 48/62 R |
| 2008/0283249 A1 | 11/2008 | Zubrin et al. | |
| 2009/0061372 A1 | 3/2009 | Just et al. | |
| 2009/0064578 A1 | 3/2009 | Theegala | |
| 2010/0096594 A1 * | 4/2010 | Dahlin | C10K 1/002 252/372 |
| 2010/0146858 A1 | 6/2010 | Zamansky et al. | |
| 2010/0154304 A1 | 6/2010 | Tsangaris et al. | |
| 2010/0326087 A1 | 12/2010 | Kawase et al. | |
| 2011/0023363 A1 | 2/2011 | Mason | |
| 2011/0036014 A1 | 2/2011 | Tsangaris et al. | |
| 2011/0081290 A1 | 4/2011 | Carnegie | |
| 2011/0104575 A1 | 5/2011 | Mui et al. | |
| 2011/0248218 A1 * | 10/2011 | Sutradhar | C01B 3/36 252/373 |
| 2012/0145965 A1 | 6/2012 | Simmons et al. | |
| 2012/0309856 A1 * | 12/2012 | Eilos | C01B 3/48 518/702 |
| 2013/0199920 A1 | 8/2013 | Demir | |
| 2013/0230433 A1 * | 9/2013 | Watkinson | B01J 19/24 422/162 |
| 2013/0291437 A1 * | 11/2013 | Martella | C10B 47/30 48/111 |
| 2013/0313481 A1 | 11/2013 | Perez | |
| 2013/0340339 A1 | 12/2013 | Lee et al. | |
| 2014/0001406 A1 | 1/2014 | Kar et al. | |
| 2014/0004471 A1 | 1/2014 | Vandergriendt et al. | |
| 2014/0048744 A1 | 2/2014 | Avagliano et al. | |
| 2014/0069003 A1 * | 3/2014 | Calderon | A01G 1/001 47/58.1 R |
| 2014/0230327 A1 | 8/2014 | Edmondson et al. | |
| 2015/0059245 A1 | 3/2015 | Appel et al. | |
| 2015/0090938 A1 | 4/2015 | Meyer et al. | |
| 2015/0232771 A1 * | 8/2015 | Bell | C10J 3/84 422/618 |
| 2015/0374935 A1 | 12/2015 | Bouchard | |
| 2016/0068770 A1 | 3/2016 | Appel et al. | |
| 2016/0068771 A1 | 3/2016 | Appel et al. | |

FOREIGN PATENT DOCUMENTS

| | | |
|---|---|---|
| JP | 2009228958 A | 10/2009 |
| JP | 2011126997 A | 6/2011 |
| KR | 1019990081315 | 11/1999 |
| KR | 20020023280 | 3/2002 |
| KR | 1020050098801 | 2/2007 |
| KR | 100824599 B1 | 4/2008 |
| KR | 1020080067676 A | 7/2008 |
| KR | 20110026933 | 3/2011 |
| WO | 2013036694 A1 | 3/2013 |
| WO | 2013149170 A1 | 10/2013 |

OTHER PUBLICATIONS

"http://www.allpowerlabs.com/products/100kw-powertainer", Downloaded Jun. 16, 2015.

"https://www.youtube.com/watch?v=GrXt7RxWDzw", viewed on www.youtube.com on Aug. 4, 2015.

International Search Report and Written Opinion for International Application No. PCT/US2014/054143 mailed on Dec. 23, 2014.

* cited by examiner

APPARATUSES, SYSTEMS, TAR CRACKERS, AND METHODS FOR GASIFYING HAVING AT LEAST TWO MODES OF OPERATION

CROSS REFERENCE TO RELATED APPLICATIONS

This application claims benefit under Title 35, United States Code, Section 119(e) of U.S. provisional patent application Ser. No. 62/046,076, filed Sep. 4, 2014. The 62/046,076 application is hereby incorporated by reference in its entirety for any purpose.

BACKGROUND OF THE INVENTION

Biomass gasification is an effective way of converting plant material into a valuable energy source. The energy source generated from the gasification process is an energy dense fuel gas called syngas. However, the gasification process also creates significant amounts of vaporous tars. As the gas stream cools, the vaporous tars may condense and deposit themselves on downstream components. The deposited tars may reduce reliability of the system by fouling and/or damaging the downstream components.

Further, other waste streams present in the gasification process may include wastewater and smoke. The wastewater may be generated from moisture in the biomass material. The wastewater may condense as the syngas stream cools. In addition, heavy smoke is produced during the startup phase of the gasification process. These wastes also have hydrocarbons and carbon dust suspended in the water and smoke making ordinary disposal even more difficult.

Additionally, current methods of igniting a gasifier to initiate the gasification process involve many moving mechanical parts that are prone to malfunction. For example, an existing system may include an actuator-controlled igniter in which the igniter is mechanically inserted into the gasifier. In addition to the mechanical components, these types of ignitors require an access port in the high temperature zone of the gasifier, which may introduce another failure point in the gasifier causing the release of heat and gases, and could ultimately destroy or damage the gasifier core.

SUMMARY

Example systems are disclosed herein. An example system may include a tar cracker configured to, in a first configuration, receive air at a first port, heat the air, and provide the heated air from a second port. The tar cracker may be further configured to, in a second configuration, receive syngas at the second port, heat the syngas to breakdown tars entrained in the syngas, and provide the syngas from the first port to downstream components such as a gas collection unit, an internal combustion engine, etc. The example system may further include a gasifier configured to, in the first configuration, receive the heated air from the tar cracker at a gasifier port and initiate gasification using the heated air. The gasifier may be further configured, in the second configuration, to gasify biomass to provide the syngas from the gasifier port.

Another example system may include a gasifier comprising a combustion chamber configured, during a startup operation, to receive heated air at a first port near a bottom of the combustion chamber and to support combustion of a column of biomass feedstock in an upward direction within the combustion chamber. The combustion chamber may be further configured to receive, during normal operation, air at a second port near a top of the combustion chamber to support gasification of the column of biomass feedstock in a downward direction within the combustion chamber to provide syngas from the first port near the bottom of the combustion chamber.

Example methods are disclosed herein. An example method may include, during a startup operation, heating air using a tar cracker and providing the heated combustion air to a port at a base of a gasifier, and mixing the heated air with biomass feedstock in a column of the gasifier to ignite the biomass feedstock. The ignition of the biomass feedstock may start at a bottom of the gasifier and move upward. The example method may further include, during a normal operation, providing air to a port near a top of the gasifier, and mixing the air with the biomass feedstock in the column of the gasifier to gasify the biomass feedstock to produce syngas. The process of gasifying the biomass feedstock starts at the top of the gasifier and moves downward.

There has thus been outlined, rather broadly, some of the features and embodiments of the invention in order that the detailed description thereof may be better understood, and in order that the present contribution to the art may be better appreciated.

It is to be understood that the invention is not limited to the details of construction or to the arrangements of the components set forth in the following description or illustrated in the drawings. The invention is capable of other embodiments and of being practiced and carried out in various ways. In addition, it is to be understood that the phraseology and terminology employed herein are for the purpose of the description and should not be regarded as limiting.

BRIEF DESCRIPTION OF THE DRAWINGS

Various other objects, examples, features, and attendant advantages of the present invention will become fully appreciated as the same becomes better understood when considered in conjunction with the accompanying drawings, wherein.

DETAILED DESCRIPTION

The present disclosure is generally directed to a tar cracker system and/or mechanism for removal of tar in a biomass gasification system. Removal of vaporous tar content from a syngas stream may prevent fouling and damage to components of a gasification system. Many of the specific details of certain embodiments are presented in the following description and in FIGS. 1-5, to provide a thorough understanding of such embodiments. One skilled in the art will understand, however, that the present invention may have additional embodiments, or may be practiced without several of the details described in the following description.

Figure 1:
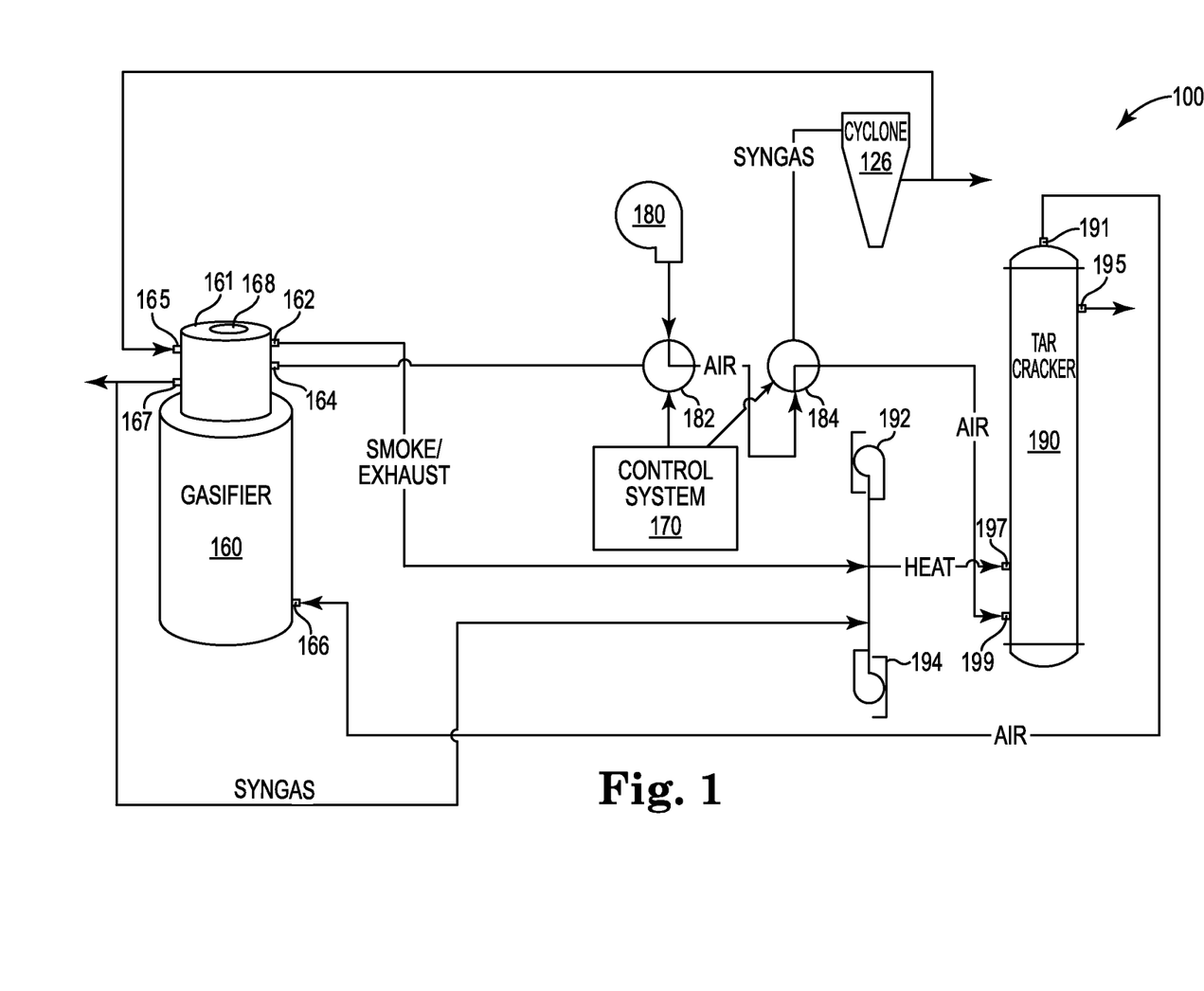
FIG. 1 is a block diagram of an exemplary portion of a gasification system including a tar cracker connected in a first configuration according to an embodiment of the disclosure.
Figure 2:
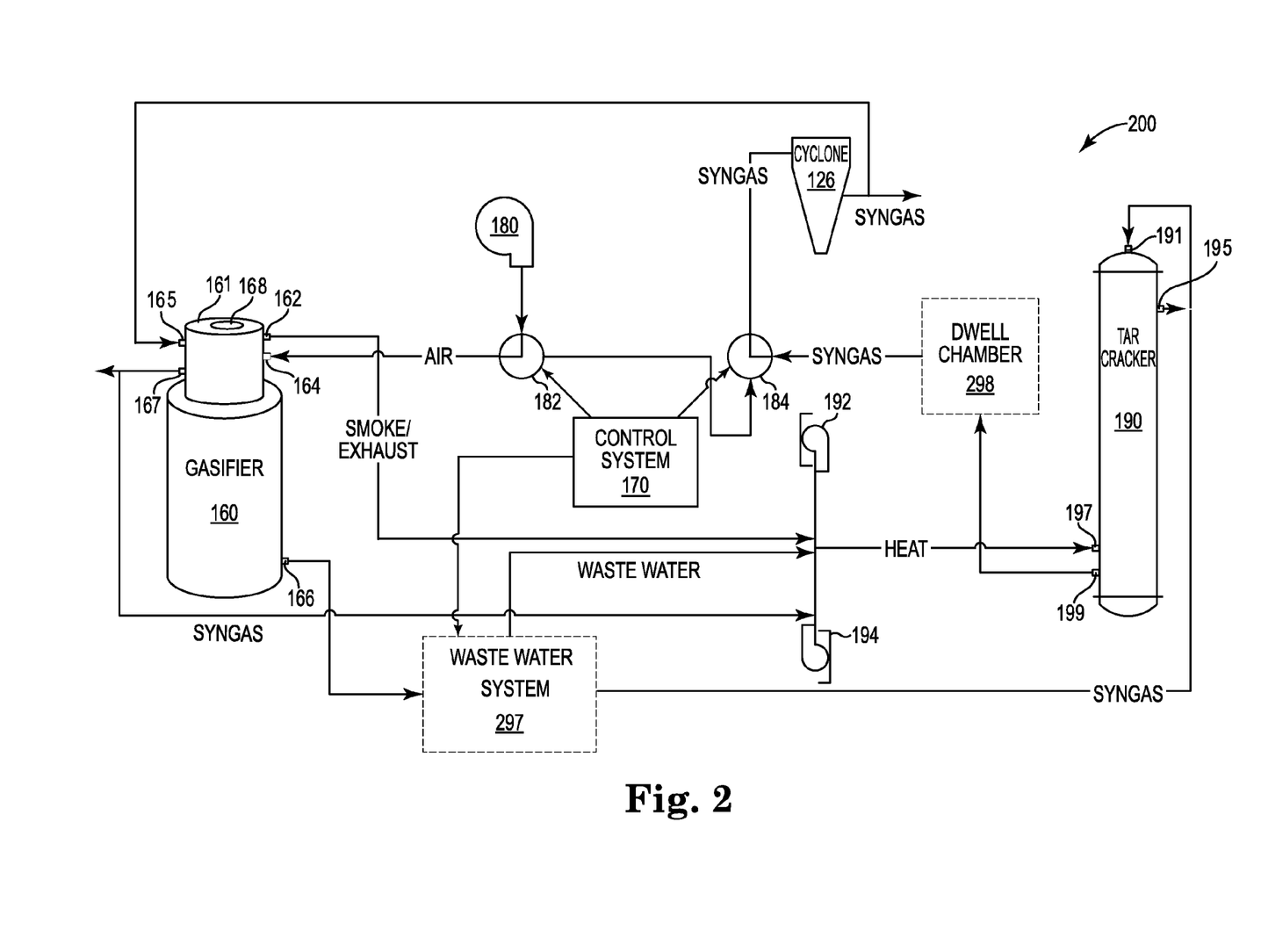
FIG. 2 is a block diagram of an exemplary portion of a gasification system including a tar cracker connected in a first configuration according to an embodiment of the disclosure.

FIGS. 1 and 2 schematically depict a portion of a gasification system 100 and a gasification system 200, respectively, that each includes a tar cracker 190 according to an embodiment of the instant invention. Gasification system 100 is shown connected in a startup operation configuration and gasification system 200 is shown connected in a normal operation configuration. FIGS. 1 and 2 include common elements, which are referenced using the same reference numbers.

Turning now to FIG. 1, gasification system 100 is shown in a startup configuration. During startup, gasification system 100 is connected such that tar cracker 190 may provide heated gas (e.g. air) to gasifier 160 for use in facilitating the initiation of the gasification process (i.e. igniting the biomass). Tar cracker 190 as shown includes ports 191, 195, 197, and 199. Gasifier 160 as shown includes ports 162, 164, and 166. Ports 162 and 164 may be located in a pre-heater portion of gasifier 160. Valve 182 is provided to control the connection of blower 180 to port 164 of gasifier 160 and/or port 199 of tar cracker 190. Valve 184 is provided to control the connection of cyclone 126 to port 199 of tar cracker 190. Burners 192 and 194 provide heat for the operations described with reference to tar cracker 190. Generally, burners 192 and/or 194 may be positioned to heat exhaust (which may contain smoke) received from gasifier 160 through port 162 in the startup configuration and provide heated exhaust to tar tracker 190 through port 197. Tar cracker 190 removes or reduces a tar content of the heated exhaust, and may provide the heated gas (e.g. air) to gasifier 160 for use in the startup process. Control system 170 may control a position of valve 182 and valve 184 to facilitate placing gasification system 100 into startup configuration where blower 180 may be disconnected from port 164 of gasifier 160. Port 164 of gasifier 160 may be used during normal operation as a combustion air input port for gasifier 160 provided by blower 180. During startup, however, blower 180 may instead blow air into tar cracker 190. Valve 184 may be controlled such that cyclone 126 may be fluidly disconnected from tar cracker 190 in the startup configuration. During normal operation, cyclone 126 may further clean syngas received from tar cracker 190 from port 199 by separating entrained char and other particulate matter from the gas stream.

In the startup configuration, valve 182 connects blower 180 to tar cracker port 199. Tar cracker 190 heats the air as it traverses the tube side of tar cracker 190 from port 199 to port 191. The heated air is provided to gasifier 160 via port 166 to initiate (and/or continue initiation of) a gasification process within gasifier 160.

Gasification system 100 may further include burners 192 and 194 positioned to provide thermal input into tar cracker 190 to heat the air from blower 180 as it traverses tar cracker 190. For example, one or more of the burners 192 and 194 may provide a flame and direct the resultant hot gasses into port 197, which may heat air received in tar cracker 190 from gasifier 160 through port 197.

During normal operation, gasifier 160 may gasify biomass (e.g. straw, woody biomass, animal waste, grape pomace, and/or other organic matter) to produce syngas. Gasifier 160 may be implemented using a downdraft gasifier such that during gasification, the biomass and combustion air generally flows through gasifier 160 from top to bottom (e.g., the direction from port 164 to port 166). Example gasifier systems described herein may utilize an updraft flow to initiate or aid in initiation of the gasification process. Referring to FIG. 1, heated air is provided to gasifier 160 through port 166. During normal operation, port 166 may ordinarily be used to remove syngas from gasifier 160. The port 167 may be used to remove syngas from the preheater 161. By introducing the heated air into gasifier 160 at port 166, an updraft process (from port 166 to port 162) may be utilized to facilitate initiation of downdraft gasification (from port 164 to 166). The heated air is provided into gasifier 160 at port 166 and the heated air may heat biomass to the point of combustion. The combustion propagates vertically up the chamber of gasifier 160. Once gasification has begun (e.g. a temperature or time threshold is reached), a normal configuration may be established where gasifier 160 is operated as a downdraft gasifier.

Blower 180 draws ambient air and provides pressurized air to tar cracker 190 when blower valve 182 is positioned to connect blower 180 and port 199 and/or when valve 184 is positioned to disconnect cyclone 126 from port 199. Blower valve 182 and cyclone valve 184 may be implemented using generally any valve (e.g. diverter valves or knife gates). Valves 182 and 184 may be opened, closed, or positioned in accordance with a desired mode of operation (e.g. startup or normal operation). The change in position of blower valve 182 and cyclone valve 184 may be controlled via control system 170, and/or may be manually operated.

Tar cracker 190 may be implemented using any of a variety of heat exchanger types. In the preferred embodiment, a tube and shell heat exchanger is used. The tube and shell arrangement generally has an array of small tubes that may transfer the air provided from blower 180 at port 199 along the length of the heat exchanger and out of port 191. The outer (i.e. shell) chamber of tar cracker 190 may be heated using heat generated by one or both of first burner 192 or second burner 194. Burners 192 and 194 may burn any combustible gas including, but not limited to, propane, natural gas, or syngas. In some examples, first burner 192 may burn a first gas, and second burner 194 may burn a second gas. For example, first burner 192 may burn propane or natural gas, and second burner 194 may burn syngas. Having two burners may allow one of burners 192 or 194 to burn propane or natural gas during the startup and then gasification system 100 may switch to the other burner to burn syngas once gasification system 100 is producing enough syngas to provide sufficient heat to tar cracker 190. The switch from using one burner burning propane or natural gas to the burner burning syngas may happen at once or may occur gradually by lowering intensity of the propane or natural gas burner as intensity of the second burner is ramped up. In other embodiments, gasification system 100 may include only a single burner that is configured to burn any type of gas, and the type of gas may be switched when gasification system 100 is producing enough syngas to allow the burner to sufficiently heat tar cracker 190. In another embodiment, gasification system 100 may include a single burner that is configured to burn stored syngas, and switch to syngas generated "in real time" once gasification system 100 is producing a steady flow of syngas, during normal operation. In any case, switching from one gas (be it stored syngas, stored propane, stored natural gas, or stored hydrogen, etc.) to syngas produced "in real time" may happen gradually by lowering the amount of stored gas that flows into the burner and slowly increasing the amount of "real time" syngas, to ensure the burner runs as efficiently as possible. The flames and hot combustion gasses from either or both of first burner 192 or second burner 194 may enter tar cracker 190 at port 197. The heat may conduct through the tube wall of the smaller tubes of tar cracker 190 to heat the combustion air in them. The flame of first burner 192 and/or second burner 194 may be adjusted to heat the combustion air to a desired temperature as it exits tar cracker 190 at port 191. The heated, combustion air stream may be provided to port 166 of gasifier 160. Tar cracker 190 may further include an exhaust port 195 for exhaust gas.

As the heated pressurized air enters port 166, it comes in contact with the raw biomass provided in gasifier 160. Moisture may be driven out of the biomass as it rises in temperature. At a certain temperature threshold, the biomass may combust within the column of gasifier 160. As hot air continues to blow into gasifier 160, combustion spreads in the lower part of gasifier 160 and moves upward. As combustion spreads and grows, smoke may be produced, which includes vaporized tars. The relatively cool start-up temperatures produce much more of the vaporous tar than the hot temperatures during normal operation. Thus, the smoke may exit gasifier 160 at port 162 and may be exposed to burner 192 and/or 194. Burner 192 and/or 194 may heat and destroy or reduce the vaporized tar, and the neutralized startup smoke may exit tar cracker 190 through exhaust port 195.

When the temperature profile of the column of biomass within gasifier 160 reaches normal operation levels, gasification system 100 may transition to the normal operation configuration depicted in gasification system 200 of FIG. 2, marking the end of startup operation. The transition from the startup operation configuration to the normal operation configuration may be controlled by control system 170.

The procedure for startup may therefore involve using updraft of the pressurized airflow in a downdraft gasifier. For example, during normal operation, gasifier 160 operates with air entering the top of the column of gasifier 160 (e.g. at port 164) and moving down through the column, with syngas exiting the base of gasifier 160 at port 166. However, during startup operation, the pressurized air flows in the opposite direction. This may allow the ignition to start at the bottom of gasifier 160 and move upwards with the highest temperatures being at the bottom of gasifier 160. Having the higher temperatures at the bottom may help gasifier 160 reach the desired column temperature profile more quickly, as compared with igniting gasifier 160 from the top.

Further, the smoke created during startup may be filtered by the biomass as it rises through the column of gasifier 160. Tars may be trapped as the smoke moves up through the biomass, and then may be heated and destroyed within the gasifier 160 during normal operation. Performing the startup from the bottom may also assist in drying the biomass in the column of gasifier 160 as the temperature rises. Further, using tar cracker 190 during the startup process brings other components of gasification system 100 (e.g. tubing, other chambers) to operational temperatures, reducing deposits on and/or clogging in those components.

Turning now to FIG. 2, tar cracker 190 of gasification system 200 is illustrated connected in a normal operation configuration. In the normal operation configuration, blower valve 182 may provide the pressurized combustion air from blower 180 to port 164 of gasifier 160. Gasifier 160 gasifies biomass, which is provided at port 168. Syngas flows out of gasifier 160 through port 166. The syngas stream from port 166 may include entrained vaporized tars, wastewater from the biomass, and other pollutants.

In one embodiment, wastewater system 297 is implemented to filter the steam entrained in the syngas stream. If left in the syngas stream, the steam may condense in cooler portions of gasification system 100, which may affect performance and/or reliability of downstream components of gasification system 100. The filtered steam may condense and collect at wastewater system 297 as wastewater. Wastewater system 297 may inject the wastewater into the flame of first burner 192 and/or second burner 194 to convert the wastewater to steam and destroy and/or reduce hydrocarbons entrained in the wastewater. Control system 170 monitors one or more temperatures of tar cracker 190, and may respond to varying temperature data to control water flow to first burner 192 and/or second burner 194 by wastewater system 297. For example, control system 170 may halt water injection by closing off pumps and/or valves that provide wastewater to tar cracker 190 if temperatures in tar cracker 190 become too low. Wastewater system 297 may include a level sensor that provides level information to control system 170, which may turn off a pump and/or close valves to tar cracker 190 when the level sensor indicates all wastewater has been consumed and/or is below a threshold level, and may restart pumps and/or open valves when the level sensor indicates wastewater is present and/or above a threshold level.

As in gasification system 100 of FIG. 1, first burner 192 and/or second burner 194 may provide a heat source (e.g. flames and hot combustion gasses) to the main chamber of tar cracker 190 via port 197. Heated exhaust (which may include smoke) from gasifier 160 may similarly be heated, and in some examples, cleaned, by use of burners 192 and/or 194, and the heated/cleaned exhaust provided to tar cracker 190 for use in heating the syngas. Tar cracker 190 may include one or more temperature sensors to monitor the temperature inside tar cracker 190, to determine whether tar cracker 190 is within designed temperature thresholds. In an example, the temperature of tar cracker 190 is kept below a certain threshold temperature, for example 1100 C, for metallurgical reasons (e.g. to avoid altering the properties or decomposition of a metal making up tar cracker 190). The temperature may be regulated by adding excess air, such as via an unused burner of burners 192 or 194. For example, when a first burner (e.g. a propane burner) is lit, a second burner (e.g. a syngas burner) may blow only air, thus cooling tar cracker 190. Alternatively, when the second burner is lit, the first burner may blow only air to cool tar cracker 190. Other methods of injecting cooling air may be used, such as forced convective cooling on the outer shell of the tar cracker 190. Further, water or another liquid may be pumped in a cooling loop to cool the tar cracker shell. The water or other liquid cycled in this loop may be obtained from wastewater system 297.

In the preferred method of operation, syngas from gasifier port 166 is received at port 191 of tar cracker 190. Tar cracker 190 then heats and reduces and/or destroys vaporized tars and/or other pollutants to clean the syngas as it traverses the array of small tubes of tar cracker 190. Tar cracker 190 then provides the heated syngas stream out of port 199 to cyclone 126. For example, valve 184 is positioned to connect port 199 to cyclone 126. Syngas is then able to flow from port 199 to cyclone 126. The positions of valves 182 and 184 may be controlled by control system 170, or may be manually controlled. Cyclone 126 may be used to remove biochar and other materials entrained in the syngas stream to provide a cleaner syngas stream at an output. The syngas stream provided at the output of cyclone 126 may be provided to a preheater 161 of gasifier 160 via inlet 165 or to another heat exchanger to cool syngas. A portion of the syngas exiting from cyclone 126 may then be routed back to blower 194 and used in combustion to heat the shell side of tar cracker 190.

In some embodiments, gasification system 200 may further include a dwell chamber 298 connected to an output of tar cracker 190 between port 199 and valve 184. In such an embodiment, dwell chamber 298 would be used to maintain the high temperatures of the syngas exiting tar cracker 190 and extend the time the vaporous tars are subjected to the elevated heat of tar cracker 190. The inclusion of dwell chamber 298 in this manner would enable gasification system 200 to break the tars down more completely and produce biochar that is more activated.

Figure 5:
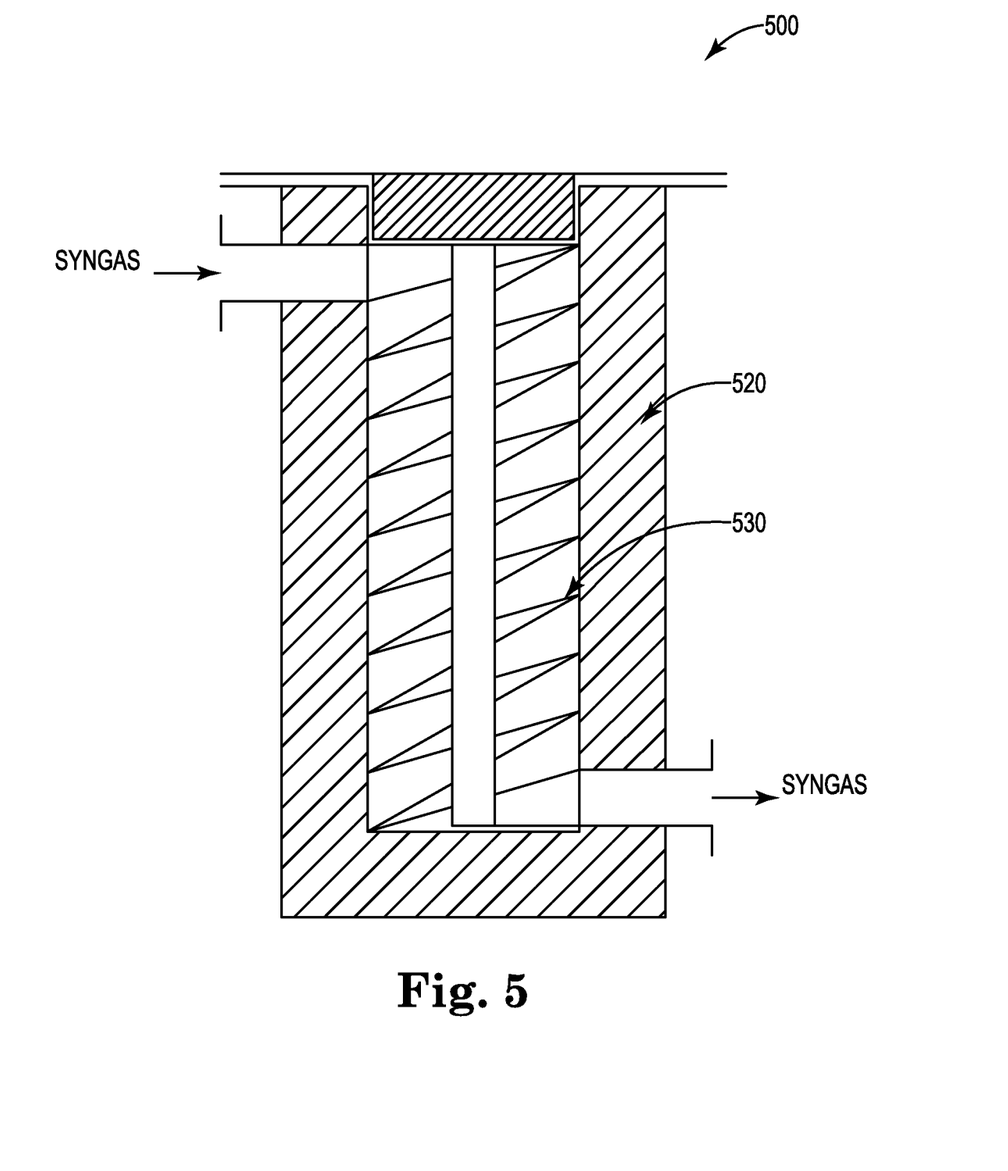
FIG. 5 is a cross-sectional side view of a dwell chamber according to an embodiment of the disclosure.

FIG. 5 schematically depicts an example of a dwell chamber 500. Dwell chamber 500 includes a hollow metal tube with flighting 530, similar to auger flighting, positioned inside the tube. Flighting 530 causes the syngas to flow in a helical pattern, which increases dwell or residence time. Flighting 530 directs the flow of any char or ash in the syngas stream to the exit port. This may aid in ensuring that char is carried away by the higher velocity syngas at the outlet port. Flighting 520 may be metal or fabricated from refractory or other suitable high temperature material. Flighting 520 may also be constructed such that it is removable from the dwell chamber 500 for service or cleaning Dwell chamber 500 may be surrounded in refractory insulation 520 to prevent heat loss or the entire chamber may be made from refractory. Such construction may or may not eliminate the need for additional insulation on the exterior.

While FIGS. 1 and 2 only show control system 170 as connected to valves 182 and 184 and wastewater system 297 of FIGS. 1 and/or 2, control system 170 may also be connected to other components of the gasification system 100 and/or the gasification system 200 to monitor or control operation. For example, control system 170 may control operation of burners 192 and 194, such as turning on or off or controlling intensity. Control system 170 may control and monitor gasification in gasifier 160, such as controlling injection of combustible air, a stir rate, etc., and/or monitoring temperature and/or biomass level in gasifier 160. Control system 170 may control operation of blower 180, such as turning on or off or controlling air speed/pressure. Control system 170 may also monitor temperatures of tar cracker 190 to adjust burner 192 or 194 intensity.

Figure 3:
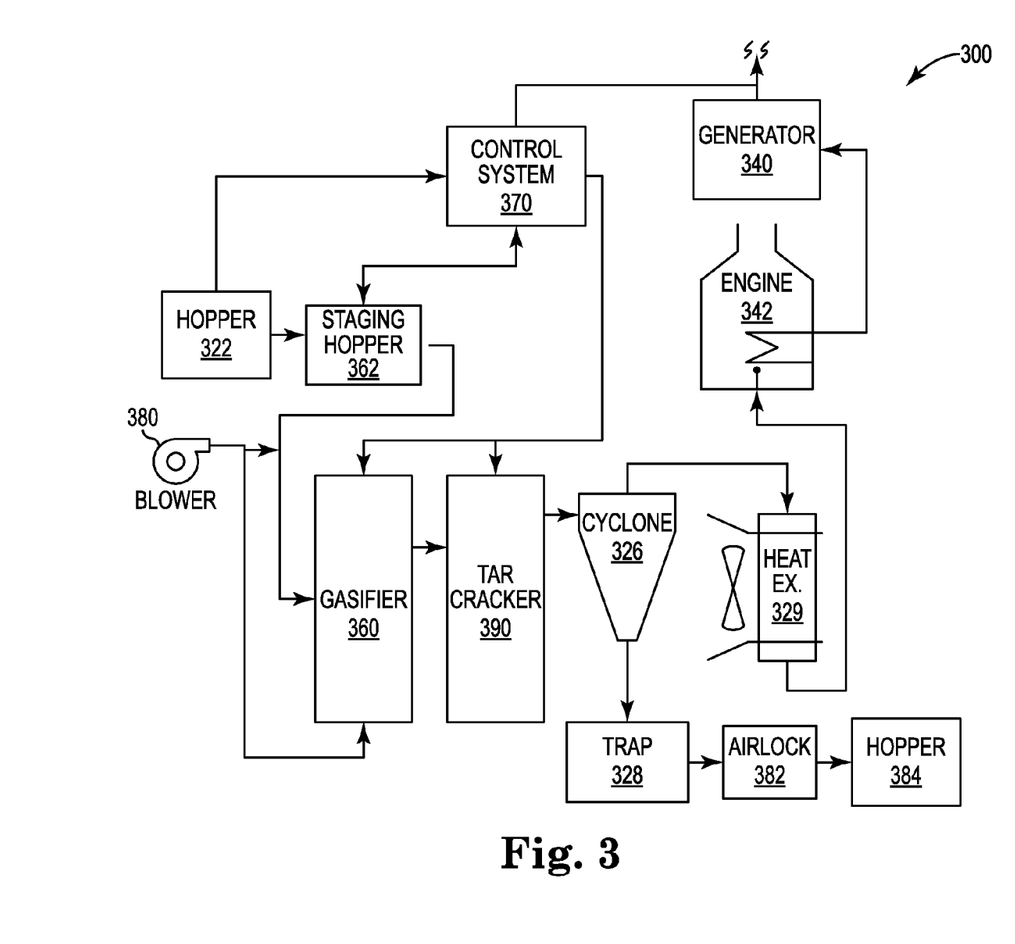
FIG. 3 is a block diagram of a gasification system according to an embodiment of the disclosure.

FIG. 3 is a block diagram of a gasification system 300 according to an embodiment of the disclosure. Gasification system 300 may be used to implement gasification system 100 of FIG. 1 and/or gasification system 200 of FIG. 2. Gasification system 300 may include a hopper 322, a staging hopper 362, and a blower 380 that assists feed of the biomass from staging hopper 322 to gasifier 360 and feeds combustion air into a gasifier 360. Elements with a similar description and/or similarly described function that are depicted in FIG. 3 may be different than those depicted in FIGS. 1 and 2, or in some examples, the same elements may be used. Gasifier 360 may provide syngas as an output to a tar cracker 390. Tar cracker 390 may be implemented using tar cracker 190 of FIGS. 1 and 2. In normal operation, tar cracker 390 breaks down and destroys tar entrained in the syngas stream. Tar cracker 390 may also further activate the activated biochar entrained in the syngas stream to increase the quality of the activated biochar. The syngas output from tar cracker 390 is provided to a cyclone 326. Cyclone 326 may separate bio-char that is entrained in the syngas flow and may optionally provide the syngas to a heat exchanger 329. In some embodiments, cyclone 326 may provide the syngas back to a preheater of gasifier 360, which then provides the syngas to heat exchanger 329. In some embodiments, the configuration of tar cracker 390 and cyclone 326 may be reversed, such that cyclone 326 may receive the syngas from gasifier 360 and may provide the syngas separated from the biochar to tar cracker 390, and tar cracker 390 may provide the syngas to heat exchanger 329. Reversing the order of tar cracker 390 and cyclone 326 may allow the entrained activated biochar to be filtered from the syngas stream prior to flowing through tar cracker 390, and thus may reduce chances of clogging tar cracker 390; however, this sequence is at the expense of activated biochar quality that could be produced by the system. A trap 328 receives the separated bio-char from cyclone 326 and provides the separated bio-char to a hopper 384 via airlocks 382. In some embodiments, the transport means between trap 328 and airlocks 382 may include a mechanism for cooling the biochar prior to providing the biochar to airlocks 382.

The system 300 is configurable to adapt to many output modules. For example, in one configuration a heat exchanger 329 is implemented to extract heat from the syngas provided to it by cyclone 326 prior to use in an internal combustion engine 342. In such a configuration, engine 342 is coupled to a generator 340, and may drive generator 340 to provide electrical power. Alternatively, the produced syngas may be collected in a collection system (not shown) for distribution and/or use elsewhere. In another configuration, a gas scrubbing system is included to separate syngas constituents into its components (e.g. hydrogen, methane, etc.) for storage and/or use of any or all of the constituents. In yet another configuration, the system 300 is configured to include a system to further refine the produced syngas into any or all of the fuels within the class known as Fischer Tropsch fuels.

In operation, gasification system 300 gasifies feedstock, such as those which would be classified as residual biomass. The feedstock may be provided from hopper 322 to gasifier 360 via staging hopper 362. Gasification system 300, which may be mobile (e.g. contained in a shipping or other container that may be transported) may be a continuous flow system such that the feedstock is delivered from hopper 322 to gasifier 360 via staging hopper 362 in a continuous fashion to enable an uninterrupted flow of feedstock within the combustion of the chamber of gasifier 360 for continual operation thereof. In some embodiments, blower 380 may assist feed of the biomass into gasifier 360 from staging hopper 362. Gasifier 360 gasifies the feedstock by reacting it with heat and combustion air. The combustion air is introduced to gasifier 360 via blower 380. Blower 380 may be coupled to gasifier 360 such that airflow through gasifier 360 may be controlled in two different ways. For example, blower 380 may be connected to gasifier 360 to push combustion air into gasifier 360, or to pull syngas from gasifier 360. In other words, gasifier 360 may operate under vacuum (e.g., with blower 380 coupled between the output of gasifier 360 and the input of tar cracker 390) or under pressure (e.g., with blower 380 coupled to an input of gasifier 360). Each method has its advantages. The use of a vacuum system removing the syngas from gasifier 360 may eliminate a potential for leakage of flammable gas to the atmosphere, as the entire system is at a negative pressure relative to the atmosphere. If a leak did develop, ambient air would be forced into gasifier 360, rather than flammable syngas leaking out.

The use of a pressure system to inject the combustion air into gasifier 360 may reduce a likelihood of fouling of blower 380, because the combustion air is relatively clean as compared to syngas, which may include tars and other entrained particulates that can foul blower 380 and degrade its operation or cause it to malfunction. In some examples, mobile gasification system 300 may be configurable to switch between pressure and vacuum operation based on desired operating conditions.

Gasifier 360 may include a preheater that preheats the combustion air and feedstock using hot syngas output from tar cracker 390 or from cyclone 326. Heating the combustion air and/or the feedstock improves gasification efficiency. For example, heating feedstock reduces its moisture content prior to entering gasifier 360. Additionally, preheating the combustion air using the generated syngas drives up system efficiency by reducing the time required for gasification temperatures within gasifier 360 to be reached.

Tar cracker 390 heats the syngas from gasifier 360 to destroy vaporized tar entrained in the syngas stream, and provides the heated syngas to cyclone 326. Cyclone 326 separates the bio-char that has become entrained in the syngas flow and provides cleaned syngas to heat exchanger 329. Trap 328 collects the bio-char separated from the syngas by cyclone 326 and provides the collected bio-char to hopper 384 via airlocks 382. Passing the bio-char through the airlocks 382 may allow portions of the gasification system 300 to remain pressurized. In some embodiments, a dwell chamber may be placed in the syngas path to increase the residence time of the syngas at temperature.

Upon receiving cleaned syngas from cyclone 326, heat exchanger 329 provides cooled syngas to engine 342. Engine 342 may use the provided syngas as fuel to operate. Engine 342 may drive generator 340 to provide electrical power. In some examples, engine 342 and/or generator 340 may be supplemented or replaced with any combination of a storage tank, a furnace, a pump, or other device which may use or be driven by the syngas produced by gasifier 360 or through which stored syngas energy or syngas can be output (turbine, blower, etc.). Control system 370 is used to control various components of gasification system 300 based on data collected from its components. In some embodiments, control system 370 measures a power output of generator 340 to determine whether too little or too much syngas is being produced, for example, to operate engine 342. In some embodiments, engine 342 and/or the generator 340 may be supplemented with or replaced by a furnace, a storage tank, or another means to use the generated syngas.

In some embodiments, control system 370 controls operation of gasification system 300 to place gasification system 300 in a startup configuration and/or in a normal operating configuration. For example, control system 370 controls valves (e.g., valves 182 and 184 of FIGS. 1 and 2), pumps (e.g., the pump of wastewater system 297), etc. to direct airflow direction from blower 380 and wastewater to burners associated with tar cracker 390 based on a mode of operation. In a startup operation mode, control system 370 controls valves such that air from blower 380 (e.g., blower 180 of FIGS. 1 and 2) is directed to tar cracker 390, and tar cracker 390 may provide startup air into gasifier 360. In a normal operation mode, control system 370 controls valves such that air from blower 380 (e.g., blower 180 of FIGS. 1 and 2) is directed to gasifier 360, and gasifier 360 may provide syngas to tar cracker 390. Control system 370 may switch from the startup operation mode to the normal operation mode based on a temperature profile of gasifier 360.

Figure 4:
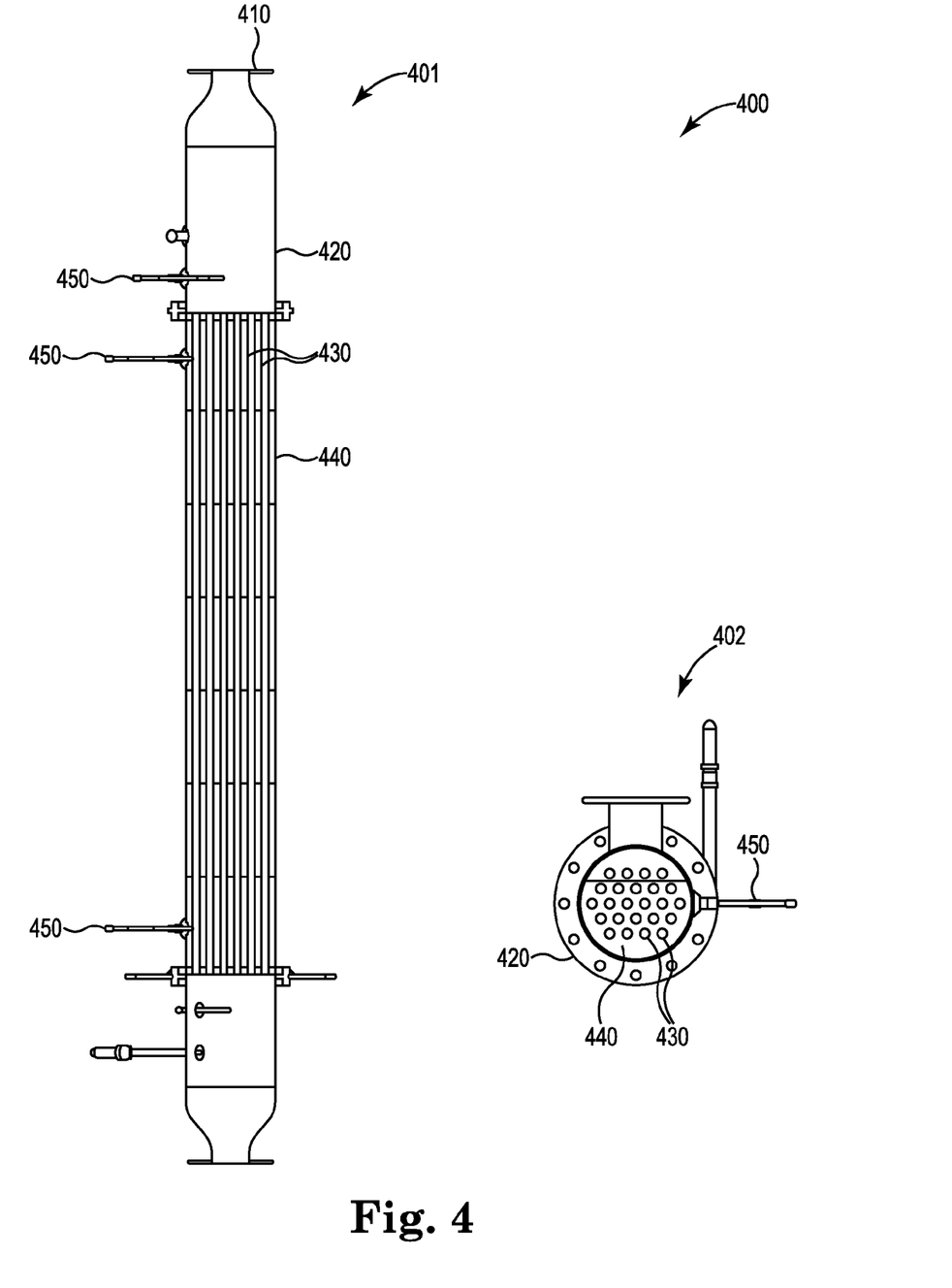
FIG. 4 is a cross-sectional side view and cross-sectional top view of a tar cracker according to an embodiment of the disclosure.

FIG. 4 depicts a partial cross-sectional side view 401 and a cross-sectional top view 402 of a tar cracker 400 from a top region 410 of the cross-sectional side view 401. Tar cracker 400 is exemplary of the type of tar cracker referred to in FIGS. 1 and/or 2 (tar cracker 190, and/or tar cracker 390 of FIG. 3. Tar cracker 400 includes heat exchanger 420, which is of tube and shell design and thus may include an array of smaller tubes 430 within a main chamber 440. Generally, smaller tubes 430 extend in parallel from a top portion of main chamber 440 to a bottom portion of main chamber 440. Main chamber 440 may be implemented using a tube. In this manner main chamber (e.g. tube) 440 may surround array of smaller tubes 430. Hot gas (e.g. air), which may, for example be generated by burners (e.g., first burner 192 and/or second burner 194 of FIGS. 1 and 2) flows through main chamber 440 and the syngas from the gasifier (e.g., gasifier 160 of FIGS. 1 and 2 and/or gasifier 360 of FIG. 3) or the combustion air from the blower (e.g., blower 180 of FIGS. 1 and 2 and/or blower 380 of FIG. 3) flows through the array of smaller tubes 430. The hot gas in main chamber 440 transfers heat to the syngas or air flowing through array of smaller tubes 430. The arrangement of smaller tubes 430 within main chamber 440 is not critical but smaller tubes 430 should be arranged and designed to maximize heat transfer. Accordingly, smaller tubes 430 are shown as having a circular cross section, but any suitable geometry (square, rectangular, etc.) could be used. Likewise, smaller tubes 430 may have surface features that enhance heat transfer (e.g. a roughened surface).

In a preferred embodiment, tar cracker 400 includes a temperature control system and method for operating heat exchanger 420. Heat exchanger 420 may include one or more temperature sensors 450 to monitor the temperature inside main chamber 440 of heat exchanger 420, to determine whether main chamber 440 is within designed temperature thresholds. In another embodiment, the temperature of this part of heat exchanger 420 may be kept below a certain threshold temperature, for example 1100 C, for metallurgical reasons (e.g. to avoid altering the properties of a metal making up the heat exchanger 420).

Refractory insulation around the shell of heat exchanger 420 may be included to reduce thermal loss from heat exchanger 420 to the ambient. Insulation may also cover the piping leading from the burners to heat exchanger 420 for similar reasons. Thermocouples may be included at various points along heat exchanger 420 to monitor the temperature of main chamber 440. Inlet and outlet temperatures of the syngas stream or the air stream may also be recorded. The on and off cycle of the burners may be monitored and adjusted by a central control system (e.g., control system 170 of FIGS. 1 and 2 and/or control system 370 of FIG. 3) based on run cycle (start up or normal run time) and on gas temperatures. In some embodiments, the heat exchanger 420 includes one or more catalysts to improve efficiency in breaking down or destroying the tars entrained in the syngas stream.

The above description of illustrated embodiments of the disclosure is not intended to be exhaustive or to limit the disclosure to the precise form disclosed. While specific embodiments of, and examples of, the disclosure are described in the foregoing for illustrative purposes, various equivalent modifications are possible within the scope of the disclosure, as those skilled in the relevant art will realize. Moreover, the various embodiments described above can be combined to provide further embodiments. Accordingly, the disclosure is not limited by the disclosure, but instead the scope of the disclosure is to be determined entirely by the following claims.

What is claimed is:

1. A system comprising:
   a tar cracker configured to, in a first configuration, receive air at a first port, heat the air, and provide the heated air to a second port, the tar cracker further configured to, in a second configuration, receive syngas at the second port, heat the syngas to breakdown tars entrained in the syngas, and provide the syngas to the first port; and a gasifier configured to, in the first configuration, receive the heated air from the tar cracker at a gasifier port and initiate gasification using the heated air, the gasifier further configured to, in the second configuration, gasify biomass to provide the syngas from the gasifier port.

2. The system of claim 1, further comprising a burner configured to provide a flame to a third port of the tar cracker, wherein the third port is connected to a main chamber of the tar cracker.

3. The system of claim 2, wherein the gasifier is further configured to, in the first configuration, provide exhaust from a second gasifier port to a flame of the burner, wherein heat from the flame of the burner is configured to break down material in the exhaust.

4. The system of claim 2, further comprising a wastewater removal system configured to remove wastewater from the syngas, the wastewater removal system further configured to provide the wastewater to a flame of a burner, wherein heat from the flame of the burner is used to break down material in the exhaust.

5. The system of claim 1, further comprising a blower configured to provide the air.

6. The system of claim 1, further comprising a valve positioned to direct the air to the first port of the tar cracker in the first configuration and to direct the air to another port of the gasifier in the second configuration.

7. The system of claim 6, further comprising a second valve positioned to direct the syngas air from the first port of the tar cracker to a cyclone in the second configuration, the cyclone configured to remove biochar from the syngas.

8. The system of claim 7, further comprising a control system configured to control the valve and the second valve based on a column temperature profile of the gasifier.

9. The system of claim 7, further comprising a dwell chamber between the second valve and the first port of the tar cracker.

10. The system of claim 1, wherein the tar cracker is a tube and shell heat exchanger that includes a main tube surrounding an array of smaller tubes extending from a top portion of the main tube to a bottom portion of the main tube, wherein the heat exchanger is configured to provide the air through the array of smaller tubes in the first configuration and to prove the syngas through the array of smaller tubes in the second configuration, wherein the main tube is configured to receive a heated gas, wherein heat in the main tube is transferred to the air in the first configuration and to the syngas in the second configuration.

11. A method, comprising:
during a startup operation:
heating air using a tar cracker including receiving air at a first port of the tar cracker, heating the air in the tar cracker, and providing the heated air to a port at a first end of a gasifier via a second port of the tar cracker, and mixing the heated air with biomass feedstock in a column of the gasifier to ignite the biomass feedstock, wherein ignition of the biomass feedstock starts at the first end of the gasifier and moves toward a second end; and during a normal operation:
providing air to a second port near the second end of the gasifier;

mixing the air with the biomass feedstock in the column of the gasifier to gasify the biomass feedstock to produce syngas, wherein gasification of the biomass feedstock starts at the second end of the gasifier and moves toward the first end;

receiving the syngas at the second ort of the tar cracker, cleaning the syngas in the tar cracker to produce clean syngas; and emitting the clean syngas from the tar cracker via the first port of the tar cracker.

12. The method of claim 11, wherein cleaning the syngas in the tar cracker includes heating the syngas using the tar cracker to break down vaporized tars entrained in the syngas.

13. The method of claim 11, further comprising transitioning from the startup operation to the normal operation based on a column temperature profile of the gasifier.

14. The method of claim 12, further comprising:
during the startup operation, injecting exhaust from the second end of the gasifier into a flame of a burner to break down materials in the exhaust; and during the normal operation, injecting wastewater into a flame of a burner to break down materials in the wastewater.

15. The method of claim 14, further comprising:
prior to production of syngas, operating the burner using a first combustible gas; and after production of the syngas by the gasifier, operating the burner using, at least in part, the syngas produced by the gasifier.

* * * * *